(12) United States Patent
Jiang et al.

(10) Patent No.: US 7,550,907 B2
(45) Date of Patent: Jun. 23, 2009

(54) FIELD EMISSION ELEMENT WITH CARBON NANOTUBE YARN

(75) Inventors: Kai-Li Jiang, Beijing (CN); Peng Liu, Beijing (CN); Yang Wei, Beijing (CN); Xiao-Bo Zhang, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 334 days.

(21) Appl. No.: 11/502,850

(22) Filed: Aug. 11, 2006

(65) Prior Publication Data
US 2007/0144780 A1    Jun. 28, 2007

(30) Foreign Application Priority Data
Nov. 4, 2005    (CN) .................... 2005 1 0101028

(51) Int. Cl.
*H01J 1/02* (2006.01)
(52) U.S. Cl. ...................... 313/309; 313/495
(58) Field of Classification Search ................. 313/309, 313/495–497, 310
See application file for complete search history.

(56) References Cited

U.S. PATENT DOCUMENTS

| | | | |
|---|---|---|---|
| 4,783,611 A * | 11/1988 | Vogels et al. ................... 313/25 |
| 6,511,527 B2 * | 1/2003 | Yang et al. ..................... 95/107 |
| 7,045,108 B2 | 5/2006 | Jiang et al. | |
| 2004/0051432 A1 * | 3/2004 | Jiang et al. .................. 313/311 |

* cited by examiner

*Primary Examiner*—Toan Ton
*Assistant Examiner*—Hana A Sanei
(74) *Attorney, Agent, or Firm*—D. Austin Bonderer

(57) ABSTRACT

A field emission element (100) includes an elongated solid body (110), a carbon nanotube yarn (112) and an electrically conductive adhesive agent (114). The carbon nanotube yarn wraps round the elongated solid body. The electrically conductive adhesive agent is applied between the elongated solid body and the carbon nanotube yarn, and the electrically conductive adhesive agent is configured for fixing the carbon nanotube yarn to the elongated solid body. The substantially all of carbon nanotube yarn is entirely adhered on a peripheral surface of the elongated solid body.

19 Claims, 2 Drawing Sheets

FIELD EMISSION ELEMENT WITH CARBON NANOTUBE YARN

CROSS-REFERENCE TO RELATED APPLICATION

This application is related to a commonly-assigned patent entitled, "METHOD FOR FABRICATING CARBON NANOTUBE YARN", filed on Dec. 31, 2002 (U.S. application Ser. No. 10/335,283). Disclosure of the above identified application is incorporated herein by reference.

TECHNICAL FIELD

The present invention generally relates to field emission elements and methods for manufacturing the same. Specifically, the present invention relates to a field emission element using carbon nanotubes and a method for manufacturing the same.

BACKGROUND

Carbon nanotubes produced by arc discharge between graphite rods were first discovered and reported in an article by Sumio Iijima entitled "Helical Microtubules of Graphitic Carbon" (Nature, Vol. 354, Nov. 7, 1991, pp. 56-58).

Carbon nanotubes are electrically conductive along their length, are chemically stable, and each can have a very small diameter (much less than 100 nanometers) and large aspect ratios (length/diameter). Due to these and other properties, it has been suggested that carbon nanotubes can play an important role in fields such as microscopic electronics, field emission devices, thermal interface materials, etc.

Nowadays, methods for manufacturing a field emission element using carbon nanotubes typically include mechanical methods and in-situ growth methods.

Mechanical methods mainly involve fixing carbon nanotubes onto a base with chemical agglutinant using a robot arm. Such a mechanical means is time consuming and difficult to operate. Furthermore, it is impossible to manipulate the carbon nanotubes with a diameter smaller than about 1 nanometer.

The in-situ growth method is generally performed as follows. Firstly, a catalyst film is deposited on a base. Secondly, a carbon nanotubes array is grown on the base using a chemical vapor deposition process or an arc-discharge process. However, a binding force between the carbon nanotubes array and the base is weak so that the carbon nanotubes array may easily fall away from the base or be pulled out by an electrical-field force.

What is needed, therefore, is a field emission element with firmly fixed carbon nanotubes and an easy-to-operate method for manufacturing the same.

SUMMARY

A field emission element according to a preferred embodiment includes an elongated body, a carbon nanotube yarn and an electrically conductive adhesive agent. The carbon nanotube yarn wraps round the elongated body. The electrically conductive adhesive agent is applied between the elongated body and the carbon nanotube yarn, and the electrically conductive adhesive agent is configured for fixing the carbon nanotube yarn to the elongated body.

A method for manufacturing a field emission element according to another preferable embodiment includes the steps of: providing an elongated body; applying an electrically conductive adhesive agent to the elongated body; wrapping at least one carbon nanotube yarn round the elongated body; solidifying the electrically conductive adhesive agent thereby using the electrically conductive adhesive agent to fix the carbon nanotube yarn to the elongated body.

Advantages and novel features will become more apparent from the following detailed description of the present field emission element and its method of manufacture when taken in conjunction with the accompanying drawings.

BRIEF DESCRIPTION OF THE DRAWINGS

Many aspects of the present field emission element and its method of manufacture can be better understood with reference to the following drawings. The components in the drawings are not necessarily drawn to scale, the emphasis instead being placed upon clearly illustrating the principles of the present field emission element and its method of manufacture. Moreover, in the drawings, like reference numerals designate corresponding parts throughout the several views.

Figure 1:
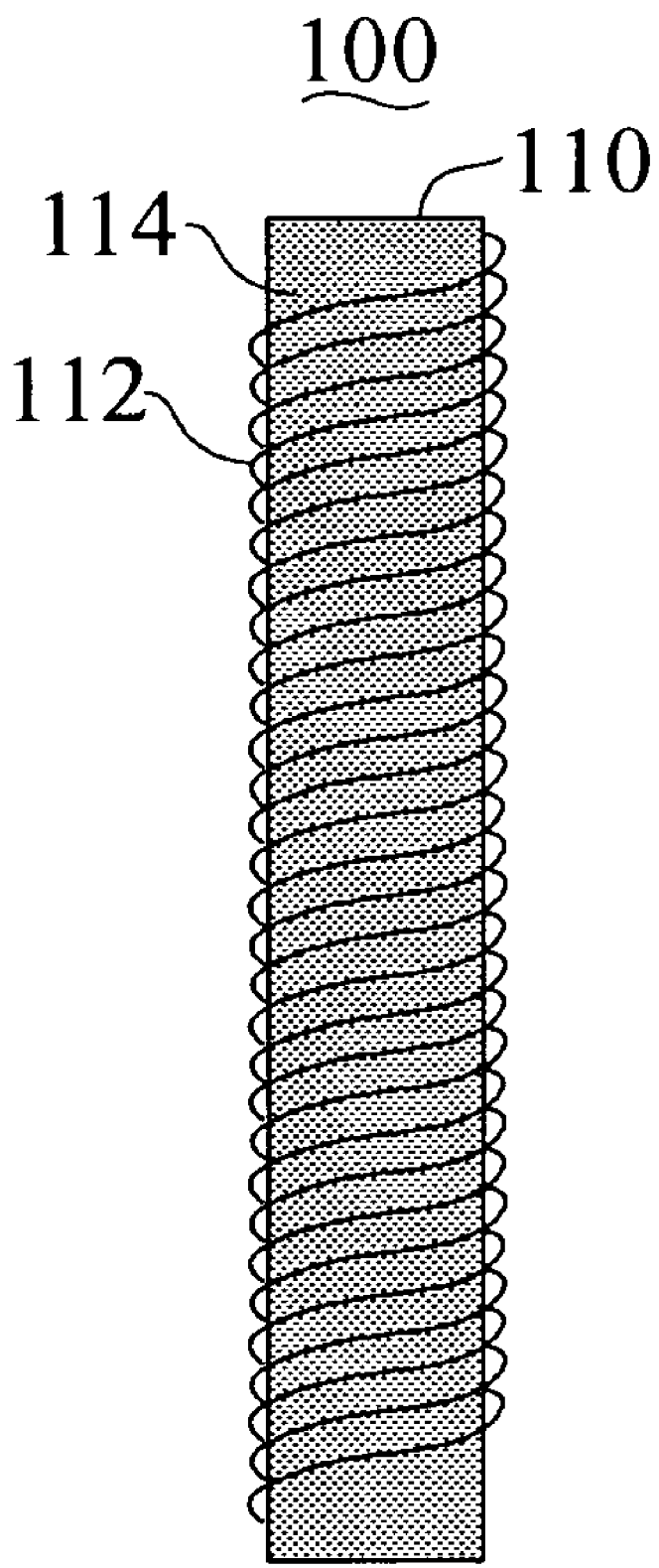
FIG. 1 is a schematic view of a field emission element using a carbon nanotube yarn in accordance with a preferred embodiment.

Corresponding reference characters indicate corresponding parts throughout the drawings. The exemplifications set out herein illustrate at least one preferred embodiment of the present field emission element and its manufacture method, in one form, and such exemplifications are not to be construed as limiting the scope of the invention in any manner.

DETAILED DESCRIPTION OF PREFERRED EMBODIMENTS

Reference will now be made to the drawings to describe preferred embodiments of the present field emission element and its manufacture method, in detail.

That a long macroscopic carbon nanotube yarn can be drawn out from a superaligned carbon nanotube array has been disclosed in U.S. Pat. No. 7,045,108, which is incorporated herein by reference. A carbon nanotube yarn includes a plurality of carbon nanotube bundles that are joined end to end by van der Waals force, and each of the carbon nanotube bundles includes a plurality of carbon nanotubes substantially parallel to each other. Each carbon nanotube bundle is joined with the carbon nanotubes adjacent to it at either end in a sideward direction instead of longitudinal direction, along an axial direction of the carbon nanotubes of each of the carbon nanotube bundles. In general, the combined width of the carbon nanotube yarn can be controlled by a size of the tips of the tool that is used to pull out the carbon nanotube yarn. The smaller the tips, the thinner the combined width of the carbon nanotube yarn. A force required to pull out the carbon nanotube yarn depends on the combined width of the carbon nanotube yarn. For example, a force of 0.1 mN is needed to pull out a 200 μm wide yarn from a superaligned carbon nanotube array. Generally, the greater the combined width of the carbon nanotube yarn, the greater the force required. A combined length of the carbon nanotube yarn depends on an area of the superaligned carbon nanotube array. Experimental data indicates that it may be possible to draw out a 10 m long 200 μm wide carbon nanotube yarn from a 100 μm high carbon nanotube array having an area of 1 $cm^2$.

Referring to FIG. 1, a field emission element 100 in accordance with a first preferred embodiment is shown. The field emission element 100 includes an elongated body 110, at least one carbon nanotube yarn 112 and an electrically conductive adhesive agent 114. The carbon nanotube yarn 112 wraps round the elongated body 110, and the electrically conductive adhesive agent 114 is applied between the elongated body 110 and the carbon nanotube yarn 112, and the electrically conductive adhesive agent 114 is configured for fixing the carbon nanotube yarn 112 to the elongated body 110.

The elongated body 110 is an electrically conductive rod in this preferred embodiment. A material of the elongated body 110 is selected from a group consisting of copper, nickel, molybdenum and other metallic materials. The elongated body 110 may also be a body with an electrically conductive surface. A shape of the elongated body 110 is cylindrical, rectangular-parallelepiped, conical or other suitable shape. Preferably, a diameter of the elongated body 110 is in a range from 10 microns to 10 millimeters.

The carbon nanotube yarn 112 including a plurality of carbon nanotube bundles is drawn out from a superaligned carbon nanotube array. Alternatively two or more carbon nanotube yarns 112 can be made to intertwine with each other. Preferably, a diameter of the carbon nanotube yarn 112 is in a range from 2 to 200 microns.

The electrically conductive adhesive agent 114 is an electrically conductive slurry agent or an electrically conductive binder agent. The electrically conductive slurry agent can be an electrically conductive slurry including gold, silver, palladium, nickel, or copper. The electrically conductive slurry agent can also be comprised of terpineol, ethyl cellulose, and electrically conductive metallic powder such as silver powder and low-melting-point glass powder. The electrically conductive binder agent is chosen from the group consisting of electrically conductive epoxy resin, electrically conductive paint and electrically conductive polymer material.

A method for manufacturing the field emission element 100 in accordance with a second preferred embodiment is described in detail below. The method includes the steps of: (1) providing an elongated body 110; (2) applying an electrically conductive adhesive agent 114 on the elongated body 110; (3) wrapping at least one carbon nanotube yarn 112 round the elongated body 110; (4) solidifying the electrically conductive adhesive agent 114 thereby the electrically conductive adhesive agent 114 fixing the carbon nanotube yarn 112 to the elongated body 110.

In step (1), a material of the elongated body 110 is selected from the material provided by the first preferred embodiment. In the second preferred embodiment, the elongated body 110 is a cylinder with a diameter in a range from 10 microns to 10 millimeters.

In step (2), the electrically conductive adhesive agent 114 is an electrically conductive slurry agent comprised of terpineol, ethyl cellulose, silvern powder and low-melting-point glass powder. The electrically conductive slurry agent is applied on the body 110 uniformly.

Figure 2:
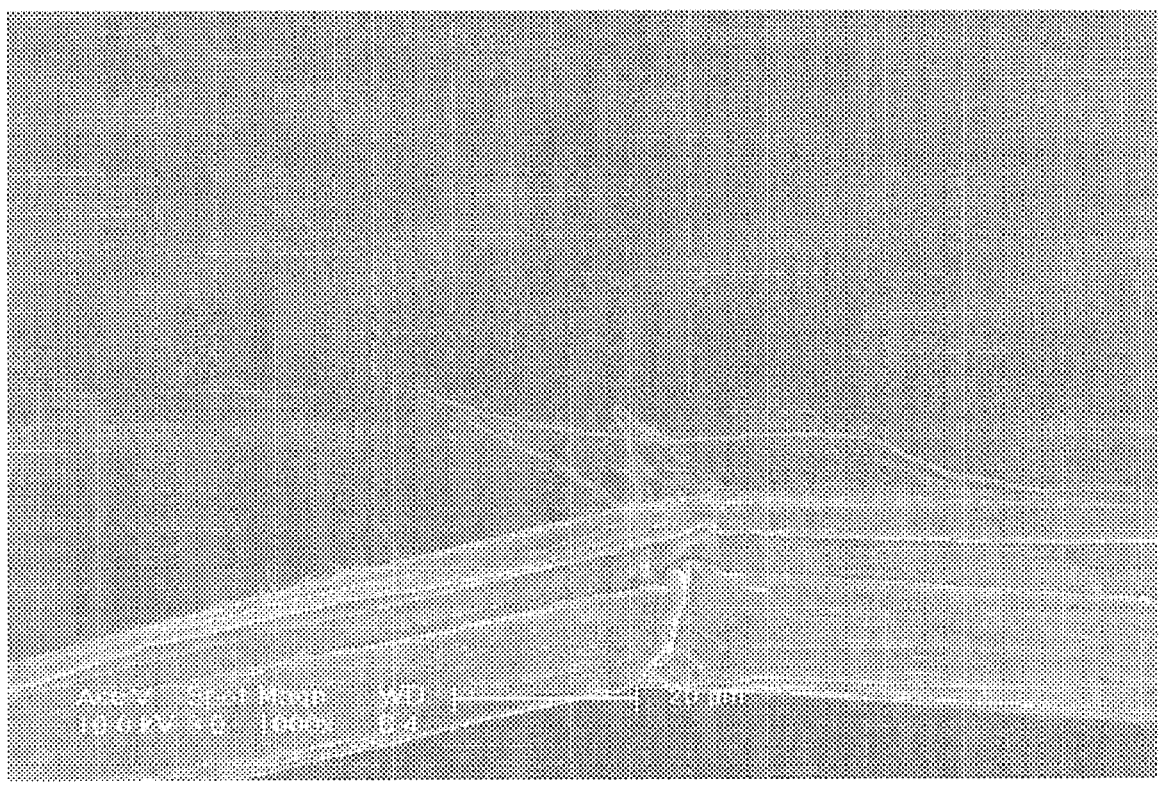
FIG. 2 is a picture of the carbon nanotube yarn of FIG. 1, taken from a transmission electron microscope.

In step (3), the carbon nanotube yarn 112 wraps round the elongated body 110. The carbon nanotube yarn 112 including a plurality of carbon nanotube bundles is drawn out from a superaligned carbon nanotube array. Preferably, a diameter of the carbon nanotube yarn 112 is in a range from 2 to 200 microns. Referring to FIG. 2, a picture of the carbon nanotube yarn 112 taken from a transmission electron microscope (TEM) is shown. The diameter of the carbon nanotube yarn 112 is about 20 microns in the picture. The carbon nanotube yarn 112 is fixed on the surface of the body 110 by the electrically conductive slurry agent 114.

In step (4), the electrically conductive adhesive agent 114 is solidified thereby using the electrically conductive adhesive agent 114 to fix the carbon nanotube yarn 112 to the elongated body 110. The electrically conductive slurry agent or the electrically conductive binder agent is solidified by heating. The field emission element 100 is formed after solidifying the electrically conductive adhesive agent 114.

The method may include an optional step of soaking the carbon nanotube yarn 112 in a chemical solvent before the wrapping step for strengthening a mechanical performance of the carbon nanotube yarn 112. The chemical solvent can be ethanol or acetone. After being soaked in the chemical solvent, the carbon nanotube yarn 112 shrinks because of its surface tension. Therefore, the mechanical performance of the carbon nanotube yarn 112 is strengthened.

The method may further include a step of surface-treating the field emission element 100 after the solidifying step so as to make tips of the carbon nanotubes protrude from the surface in a manner such that a field emission performance of the field emission element 100 is enhanced. The surface-treating step may include a step of rubbing the carbon nanotube yarn 112.

The method for manufacturing the field emission element 100 in accordance with the second embodiment is easy to use and simple to operate, the carbon nanotube yarn 112 is fixed firmly on the surface of the body 110 by the electrically conductive adhesive agent 114. Therefore, a field emission element 100 manufactured by the method can be used in many areas, such as field emission light-emitting devices.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A field emission clement, comprising:
   an elongated solid body;
   a carbon nanotube yarn wrapping round the elongated solid body;
   an electrically conductive adhesive agent applied between the elongated solid body and the carbon nanotube yarn, the electrically conductive adhesive agent being configured for fixing the carbon nanotube yarn to the elongated solid body, wherein substantially all of the carbon nanotube yarn is entirely adhered on a peripheral surface of the elongated solid body by the adhesive agent.

2. The field emission element of claim 1, wherein a diameter of the carbon nanotube yarn is in a range from 2 to 200 microns.

3. The field emission element of claim 1, wherein the conductive adhesive agent is comprised of terpineol, ethyl cellulose, electrically conductive metallic powder and low-melting-point glass powder.

4. The field emission element of claim 1, wherein the conductive adhesive agent is comprised of electrically conductive adhesive chosen from the group consisting of gold, silver, palladium, nickel, copper, and appropriate combination thereof.

5. The field emission element of claim 1, wherein the conductive binder agent is chosen from the group consisting of electrically conductive epoxy resin, electrically conductive paint and electrically conductive polymer material.

6. The field emission element of claim 1, wherein the elongated solid body is an electrically conductive rod.

7. The field emission element of claim 6, wherein a diameter of the electrically conductive rod is in a range from 10 microns to 10 millimeters.

8. The field emission element of claim 1, wherein the elongated solid body has an electrically conductive circumferential surface.

9. The field emission element of claim 1, wherein the carbon nanotube yarn and the elongated solid body have a linear contact.

10. The field emission element of claim 1, wherein the elongated solid body has a shape selected from the group consisting of cylindrical, rectangular-parallelepiped, and conical.

11. The field emission element of claim 1, wherein the carbon nanotube yarn comprises a plurality of carbon nanotube bundles that are joined end to end by van der Waals force.

12. The field emission element of claim 11, wherein each carbon nanotube bundles comprises a plurality of carbon nanotubes substantially parallel to each other.

13. The field emission element of claim 11, wherein each carbon nanotube bundle is joined with the adjacent carbon nanotubes bundles.

14. The field emission element of claim 1, wherein two or more carbon nanotube yarns are intertwined with each other.

15. A field emission element, comprising
an elongated solid body;
a carbon nanotube yarn helically twining around the elongated solid body along an orientation of the axis direction thereof;
an electrically conductive adhesive agent applied between the elongated solid body and the carbon nanotube yarn, the electrically conductive adhesive agent being configured for fixing the carbon nanotube yarn to the elongated solid body, wherein the carbon nanotube yarn is entirely adhered on a peripheral surface of the elongated solid body.

16. The field emission element of claim 15, wherein the carbon nanotube yarn comprises a plurality of carbon nanotube bundles that are joined end to end by van der Waals force.

17. The field emission element of claim 16, wherein the carbon nanotube bundles each comprises a plurality of carbon nanotubes substantially parallel to each other.

18. The field emission element of claim 16, wherein each carbon nanotube bundle is joined with the adjacent carbon nanotubes bundles.

19. The field emission element of claim 15, wherein two or more carbon nanotube yarns are made to intertwine with each other.

* * * * *